United States Patent
Iwata et al.

(10) Patent No.: US 10,858,521 B2
(45) Date of Patent: Dec. 8, 2020

(54) ANTIFOULING COATING COMPOSITIONS, ANTIFOULING COATING FILMS, ANTIFOULING SUBSTRATES, METHODS FOR PRODUCING ANTIFOULING SUBSTRATES, AND METHODS OF STORING ANTIFOULING COATING COMPOSITIONS

(71) Applicant: CHUGOKU MARINE PAINTS, LTD., Otake (JP)

(72) Inventors: Yuki Iwata, Otake (JP); Soichiro Tanino, Otake (JP); Satoshi Masuda, Otake (JP); Hideyuki Tanaka, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 505 days.

(21) Appl. No.: 15/569,866

(22) PCT Filed: May 20, 2016

(86) PCT No.: PCT/JP2016/065009
§ 371 (c)(1),
(2) Date: Oct. 27, 2017

(87) PCT Pub. No.: WO2016/190241
PCT Pub. Date: Dec. 1, 2016

(65) Prior Publication Data
US 2018/0105703 A1    Apr. 19, 2018

(30) Foreign Application Priority Data

May 22, 2015 (JP) ................. 2015-104837

(51) Int. Cl.
*C09D 5/16* (2006.01)
*C09D 7/40* (2018.01)
*C09D 7/63* (2018.01)
*A01N 25/10* (2006.01)
*A01N 43/40* (2006.01)
*A01N 43/50* (2006.01)
*A01N 55/02* (2006.01)
*A01N 55/08* (2006.01)
*A01N 59/20* (2006.01)
*C09D 133/04* (2006.01)
*C09D 143/04* (2006.01)

(52) U.S. Cl.
CPC ........... *C09D 5/1662* (2013.01); *A01N 25/10* (2013.01); *A01N 43/40* (2013.01); *A01N 43/50* (2013.01); *A01N 55/02* (2013.01); *A01N 55/08* (2013.01); *A01N 59/20* (2013.01); *C09D 5/16* (2013.01); *C09D 7/40* (2018.01); *C09D 7/63* (2018.01); *C09D 133/04* (2013.01); *C09D 143/04* (2013.01)

(58) Field of Classification Search
CPC .......... C09D 5/1662; C09D 7/40; C09D 7/63; C09D 5/16; C09D 133/04; C09D 143/04; A01N 25/10; A01N 43/40; A01N 43/50; A01N 55/02; A01N 55/08; A01N 59/20
USPC ......................................................... 524/858
See application file for complete search history.

(56) References Cited

U.S. PATENT DOCUMENTS

| 6,762,227 | B1 | 7/2004 | Elwing et al. |
| 8,840,910 | B2 | 9/2014 | Masuda et al. |
| 2011/0123478 | A1 | 5/2011 | Dahling |
| 2013/0045264 | A1* | 2/2013 | Masuda ................ A01N 43/50 |
| | | | 424/409 |

FOREIGN PATENT DOCUMENTS

| CN | 102083925 A | 6/2011 |
| CN | 102257077 A | 11/2011 |
| CN | 102791812 A | 11/2012 |
| JP | 11-333374 A | 12/1999 |
| JP | 2002-535255 A | 10/2002 |
| JP | 2016-89167 A | 5/2016 |
| WO | 2011/118526 A1 | 9/2011 |
| WO | WO 2012/048712 A1 | 4/2012 |
| WO | 2014/096102 A1 | 6/2014 |

OTHER PUBLICATIONS

Combined Chinese Office Action and Search Report dated Jul. 15, 2019 in Patent Application No. 201680024467.7 (with English translation of Categories of Cited Documents), 7 pages.
Extended European Search Report dated Oct. 1, 2018 in corresponding European Patent Application No. 16799946.5, 5 pages.
International Search Report dated Jul. 5, 2016 in PCT/JP2016/065009 filed May 20, 2016.

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

An antifouling coating composition contains a silyl ester (co)polymer and medetomidine and is used to prevent the fouling of substrates by aquatic organisms and which can form antifouling coating films exhibiting outstanding antifouling properties over a long period and also has good storage stability. The antifouling coating composition includes a silyl ester (co)polymer (A) and medetomidine (B), the silyl ester (co)polymer (A) including structural units derived from a monomer (a) represented by the general formula (I): $R^1$—CH=C(CH$_3$)—COO—(SiR$^2$R$^3$O)$_n$—SiR$^4$R$^5$R$^6$, and structural units derived from an unsaturated monomer (b) copolymerizable with the monomer (a).

18 Claims, No Drawings

ANTIFOULING COATING COMPOSITIONS, ANTIFOULING COATING FILMS, ANTIFOULING SUBSTRATES, METHODS FOR PRODUCING ANTIFOULING SUBSTRATES, AND METHODS OF STORING ANTIFOULING COATING COMPOSITIONS

TECHNICAL FIELD

The present invention relates to an antifouling coating composition and use applications thereof. More particularly, the invention relates to an antifouling coating composition which includes a silyl ester (co)polymer as a film-forming component and can be used to prevent the fouling of substrates by aquatic organisms, to an antifouling coating film and an antifouling substrate which each use the antifouling coating composition, to a method for producing an antifouling substrate using the composition, and to a method of storing the antifouling coating composition.

BACKGROUND ART

The technique that is widely used at present to prevent the fouling of structures such as vessels and submarine structures by aquatic organisms in the sea is antifouling coatings that combine a hydrolysable resin which imparts renewability to the antifouling coating film, and an antifouling agent which has a physiological activity on organisms.

Silyl ester copolymers have particularly high renewability and are widely used as such hydrolyzable resins.

Meanwhile, for example, JP-A-2002-535255 (Patent Literature 1) describes that medetomidine is useful as an agent for the inhibition of marine biofouling on a solid surface.

WO 2011/118526 (Patent Literature 2) discloses an antifouling coating composition which includes a combination of the above compounds and exhibits an outstanding antifouling performance on structures such as vessels and submarine structures even when the sea areas or conditions where such structures are navigated or installed cause high fouling loads. Some specific examples of such coating compositions disclosed are those which contain, among others, a silyl ester copolymer having structural units derived from triisopropylsilyl acrylate and medetomidine (Examples 10 and 11).

CITATION LIST

Patent Literature

Patent Literature 1: JP-A-2002-535255
Patent Literature 2: WO 2011/118526

SUMMARY OF INVENTION

Technical Problem

Unfortunately, it has been found that the antifouling coating compositions disclosed in Patent Literature 2 are difficult to store stably for long periods because the coating compositions, due to their containing a silyl ester copolymer and medetomidine, suffer a specific rise in coating viscosity or coating solidification which is presumably associated with the decomposition of the silyl ester copolymer.

In light of such problems, objects of the present invention are to provide an antifouling coating composition which contains a silyl ester (co)polymer and medetomidine and is used to prevent the fouling of substrates by aquatic organisms and which can form antifouling coating films exhibiting outstanding antifouling properties over a long period and also has good storage stability, and to provide use applications of the composition.

Solution to Problem

After extensive studies, the present inventors have found that an antifouling coating composition, in spite of its containing a silyl ester (co)polymer and medetomidine, attains an enhancement in storage stability when the silyl ester (co)polymer includes a silyl methacrylate, thus completing the present invention. A summary of the invention is described below.

[1]

An antifouling coating composition including a silyl ester (co)polymer (A) and medetomidine (B), the silyl ester (co)polymer (A) including structural units derived from a monomer (a) represented by the general formula (I):

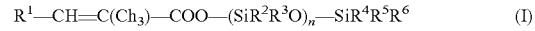
$$R^1—CH=C(CH_3)—COO—(SiR^2R^3O)_n—SiR^4R^5R^6 \quad (I)$$

[in the formula (I), $R^2$, $R^3$, $R^4$, $R^5$ and $R^6$ are each independently a $C_{1-20}$ monovalent organic group optionally having a heteroatom, $R^1$ is a hydrogen atom or $R^7—O—C=O$ (wherein $R^7$ is a hydrogen atom, a $C_{1-20}$ monovalent organic group optionally having a heteroatom, or a silyl group represented by $R^8R^9R^{10}Si$ (wherein $R_8$, $R^9$ and $R_{10}$ are each independently a $C_{1-20}$ monovalent organic group optionally having a heteroatom), and n is 0 or an integer of 1 or greater].

[2]

The antifouling coating composition described in [1], wherein the medetomidine (B) is present in a ratio of 0.01 to 50 parts by weight to 100 parts by weight of the silyl ester (co)polymer (A).

[3]

The antifouling coating composition described in [1] or [2], wherein the silyl ester (co)polymer (A) further includes structural units derived from an unsaturated monomer (b) copolymerizable with the monomer (a).

[4]

The antifouling coating composition described in [3], wherein the unsaturated monomer (b) includes at least one unsaturated monomer selected from the group consisting of alkyl (meth)acrylates, phenyl (meth)acrylate, benzyl (meth)acrylate, alkoxyalkyl (meth)acrylates, hydroxyalkyl (meth)acrylates, metal ester group-containing (meth)acrylates, organosiloxane group-containing (meth)acrylates, and monomers represented by the general formula (II):

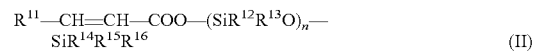
$$R^{11}—CH=CH—COO—(SiR^{12}R^{13}O)_n— \\ SiR^{14}R^{15}R^{16} \quad (II)$$

[in the formula (II), $R^{12}$, $R^{13}$, $R^{14}$, $R^{15}$ and $R^{16}$ are each independently a $C_{1-20}$ monovalent organic group optionally having a heteroatom, $R^{11}$ is a hydrogen atom or $R^{17}—O—C=O$ (wherein $R^{17}$ is a hydrogen atom, a $C_{1-20}$ monovalent organic group optionally having a heteroatom, or a silyl group represented by $R^{18}R^{19}R^{20}Si$ (wherein $R^{18}$, $R_{19}$ and $R_{20}$ are each independently a $C_{1-20}$ monovalent organ group optionally having a heteroatom), and n is 0 or an integer of 1 or greater].

[5]

The antifouling coating composition described in any one of [1] to [4], wherein $R^4$, $R^5$ and $R^6$ in the general formula (I) are all isopropyl groups.

[6]

The antifouling coating composition described in any one of [1] to [5], further including an antifouling agent (C) other than the medetomidine (B).

[7]

The antifouling coating composition described in [6], wherein the antifouling agent (C) other than the medetomidine (B) is at least one antifouling agent selected from the group consisting of cuprous oxide, copper rhodanide, copper, copper pyrithione, zinc pyrithione, 4-bromo-2-(4-chlorophenyl)-5-(trifluoromethyl)-1H-pyrrole-3-carbonitrile, 4,5-dichloro-2-n-octyl-4-isothiazolin-3-one, borane-nitrogen base adducts, N,N-dimethyl-N'-(3,4-dichlorophenyl)urea, N-(2,4,6-trichlorophenyl)maleimide, 2-methylthio-4-tert-butylamino-6-cyclopropylamino-1,3,5-triazine, 2,4,5,6-tetrachloroisophthalonitrile, bisdimethyldithiocarbamoyl sine ethylene bisdithiocarbamate, chloromethyl-n-octyl disulfide, N,N'-dimethyl-N'-phenyl-(N-fluorodichloromethylthio) sulfamide, tetraalkyl thiuram disulfides, zinc dimethyl dithiocarbamate, zinc ethylene bisdithiocarbamate, 2,3-dichloro-N-(2',6'-diethylphenyl)maleimide and 2,3-dichloro-N-(2'-ethyl-6'-methylphenyl)maleimide.

[8]

The antifouling coating composition described in any one of [1] to [7], further including a dehydrating agent (D).

[9]

The antifouling coating composition described in any one of [1] to [8], wherein the dehydrating agent (D) is at least one selected from the group consisting of calcium sulfate, hydrolyzable group-containing organosilanes, zeolites, alumina, silica and orthoesters.

[10]

The antifouling coating composition described in any one of [1] to [9], further including a rosin (E).

[11]

The antifouling coating composition described in any one of [1] to [10], which is a one pack coating.

[12]

An antifouling coating film formed from the antifouling coating composition described in any one of [1] to [11].

[13]

An antifouling substrate including a substrate and the antifouling coating film of [12] disposed on a surface of the substrate.

[14]

The antifouling substrate described in [13], which is placed in contact with seawater or freshwater.

[15]

The antifouling substrate described in [14], wherein the substrate is an underwater structure, outside shell of a ship or a fishing gear.

[16]

A method for producing an antifouling substrate, including:

a step of coating or impregnating a surface of a substrate with the antifouling coating composition described in any one of [1] to [11], and a step of curing the antifouling coating that has been caused to coat or impregnate the substrate in the previous step; or including a step of forming a film from the antifouling coating composition and curing the film to form an antifouling coating film, and a step of attaching the antifouling coating film onto a substrate.

[17]

A method of storing an antifouling coating composition, including charging the antifouling coating composition described in [11] into a container and storing the composition.

Advantageous Effects of Invention

The antifouling coating compositions of the present invention can form antifouling coating films which exhibit outstanding antifouling properties over a long period. Further, the antifouling coating compositions of the invention can be stored stably over a long period.

DESCRIPTION OF EMBODIMENTS

Aspects of the present invention such as the antifouling coating compositions will be described in greater detail hereinbelow.

In the invention, the weight based on which the contents of components are specified is, when the component contains volatiles such as a diluent solvent, the weight of the component excluding such volatiles, namely, the weight of "solid content" which can constitute a dry coating film. The term solid content means a residue that is left when any component or composition containing volatiles such as a solvent, is dried in a hot air dryer at 105° C. for 3 hours to evaporate the volatiles such as a solvent. The term "(meth)acrylate" is a collective term indicating both acrylate and methacrylate.

Antifouling Coating Compositions

The antifouling coating composition according to the present invention contains a silyl ester (co)polymer (A) and medetomidine (B).

Silyl Ester (Co)Polymers (A)

The silyl ester (co)polymer (A) is a (co)polymer which includes structural units (also written as "component units", "constituent units", "repeating units", etc.) derived from a monomer (a) represented by the general formula (I):

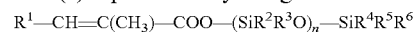

and optionally includes structural units derived from an unsaturated monomer (b) copolymerizable with the monomer (a). The phrase "component units derived from X", when X is represented by $A^1A^2C=CA^3A^4$ ($C=C$ is a polymerizable carbon-carbon double bond), are, for example, structural units represented by the following formula:

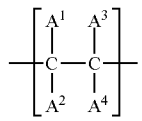

In the formula (I), $R^2$, $R^3$, $R^4$, $R^5$ and $R^6$ are each independently a $C_{1-20}$ monovalent organic group optionally having a heteroatom, with examples including linear, branched or cyclic alkyl groups, and aryl groups wherein these alkyl groups and aryl groups may have a heteroatom such as an oxygen atom interrupting a carbon-carbon bond. For the reason that the silyl ester (co)polymer (A) is hydrolyzed at an appropriate rate in the antifouling coating films of the invention, $R^2$, $R^3$, $R^4$, $R^5$ and $R^6$ are preferably each an alkyl group such as a methyl group, an ethyl group, an isopropyl group or a sec-butyl group, and are more preferably each an isopropyl group.

$R^1$ is a hydrogen atom or $R^7$—O—C=O (wherein $R^7$ is a hydrogen atom, a $C_{1-20}$ monovalent organic group optionally having a heteroatom, or a silyl group represented by $R^8R^9R^{10}Si$ (wherein $R^8$, $R^9$ and $R^{10}$ are each independently a $C_{1-20}$ monovalent, organic group optionally having a heteroatom), and is preferably a hydrogen atom.

Examples of the $C_{1-20}$ monovalent organic groups optionally having a heteroatom, represented by $R^7$, $R^8$, $R^9$ and $R^{10}$, include linear, branched or cyclic alkyl groups, and aryl groups wherein these alkyl groups and aryl groups may have a heteroatom such as an oxygen atom interrupting a carbon-carbon bond, with isopropyl group being preferable.

The letter n is 0 or an integer of 1 or greater, and is preferably 0. The upper limit of n may be, for example, 1,000.

Examples of the monomers (a) represented by the formula (I) include trialkylsilyl methacrylates such as trimethylsilyl methacrylate, triethylsilyl methacrylate, tri-n-propylsilyl methacrylate, triisopropylsilyl methacrylate, tri-n-butylsilyl methacrylate, triisobutylsilyl methacrylate, tri-sec-butylsilyl methacrylate, tri-2-ethylhexylsilyl methacrylate, butyldiisopropylsilyl methacrylate and 1-methacryloyloxynonamethyltetrasiloxane. In particular, triisopropylsilyl methacrylate is preferable because of the hydrolysis rate of the silyl ester (co)polymer (A) in the antifouling coating films of the invention and also because the antifouling coating films of the invention attain well-sustained surface renewability and high water resistance.

Some preferred unsaturated monomers (b) copolymerizable With the monomers (a) are alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, heptyl (meth)acrylate, cyclohexyl (meth)acrylate, octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate and stearyl (meth)acrylate;

phenyl (meth)acrylate;

benzyl (meth)acrylate;

alkoxyalkyl (meth)acrylates such as methoxymethyl (meth)acrylate, 2-methoxyethyl (meth)acrylate, ethoxymethyl (meth)acrylate, 2-ethoxyethyl (meth)acrylate, 4-methoxybutyl (meth)acrylate, methoxypropyl (meth)acrylate, ethoxypropyl (meth)acrylate, propoxyethyl (meth)acrylate, 2-butoxyethyl (meth)acrylate, isobutoxybutyl diglycol (meth)acrylate and phenoxyethyl (meth)acrylate;

hydroxyalkyl (meth)acrylates such as hydroxymethyl (meth)acrylate, 2-hydroxyethyl (meth)acrylate, 2-hydroxypropyl (meth)acrylate, 4-hydroxybutyl (meth)acrylate and 2-hydroxy-3-phenoxypropyl (meth)acrylate;

metal ester group-containing (meth)acrylates such as zinc (meth)acrylate, zinc di(meth)acrylate, copper (meth)acrylate and copper di(meth)acrylate;

organosiloxane group-containing (meth)acrylates, and monomers represented by the general formula (II):

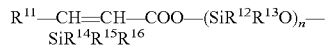
$R^{11}$—CH=CH—COO—$(SiR^{12}R^{13}O)_n$—
$SiR^{14}R^{15}R^{16}$

In the formula (II), $R^{12}$, $R^{13}$, $R^{14}$, $R^{15}$ and $R^{16}$ are each independently a $C_{1-20}$ monovalent organic group optionally having a heteroatom, with examples including linear, branched or cyclic alkyl groups, and aryl groups wherein these alkyl groups and aryl groups may have a heteroatom such as an oxygen atom interrupting a carbon-carbon bond. These substituents are preferably alkyl groups, and are more preferably isopropyl groups for the reason that the silyl ester (co)polymer (A) is hydrolyzed at an appropriate rate in the antifouling coating films of the invention.

$R^{11}$ is a hydrogen atom or $R^{17}$—O—C=O (wherein $R^{17}$ is a hydrogen atom, a $C_{1-20}$ monovalent organic group optionally having a heteroatom, or a silyl group represented by $R^{18}R^{19}R^{20}Si$ (wherein $R^{18}$, $R^{19}$ and $R^{20}$ are each independently a $C_{1-20}$ monovalent organic group optionally having a heteroatom)), and is preferably a hydrogen atom.

Examples of the $C_{1-20}$ monovalent, organic groups optionally having a heteroatom, represented by $R^{17}$, $R^{18}$, $R^{19}$ and R20, include linear, branched or cyclic alkyl groups, and aryl groups wherein these alkyl groups and aryl groups may have a heteroatom such as an oxygen atom interrupting a carbon-carbon bond, with isopropyl group being preferable.

The letter n is 0 or an integer of 1 or greater, and is preferably 0. The upper limit of n may be, for example, 1,000.] In particular, methyl (meth)acrylate, ethyl (meth)acrylate, butyl (meth)acrylate, 2-methoxyethyl (meth)acrylate, 2-hydroxyethyl (meth)acrylate and triisopropylsilyl acrylate are more preferable. Because the antifouling coating composition that is produced attains particularly high storage stability, the silyl ester (co)polymer (A) more preferably includes structural units derived from 2-methoxyethyl (meth)acrylate as the unsaturated monomer (b), and particularly preferably includes 1 to 30 wt % of structural units derived from 2-methoxyethyl (meth)acrylate.

For the reason that the antifouling coating films of the invention attain excellent properties such as well-sustained surface renewability, it is desirable that the silyl ester (co)polymer (A) usually contain the structural units derived from the monomer (a) in an amount of 10 to 100 wt %, preferably 10 to 90 wt %, and more preferably 40 to 80 wt %, and the balance be the structural units from the unsaturated monomer (b), that is, the (co)polymer usually contain the structural units derived from the unsaturated monomer (b) in an amount of 0 to 90 wt %, preferably 10 to 90 wt %, and more preferably 20 to 60 wt % (relative to the amount of all the constituent units in the silyl ester (co)polymer (A) taken as 100 wt %).

From the points of view of viscosity, storage stability and properties of coating films, it is desirable that the number average molecular weight Mn of the silyl ester (co)polymer (A) (polystyrene equivalent value measured by the method described later in Examples or a method equivalent thereto) be usually 1,000 to 200,000, and preferably 1,000 to 100,000.

The content of the silyl ester (co)polymer (A) in the antifouling coating composition of the invention is preferably 0.1 to 99 wt %, more preferably 5 to 90 wt %, and particularly preferably 10 to 80 wt % of the solid content in the composition.

The silyl ester (co)polymer (A) may be prepared by (co)polymerizing the monomer (a) optionally together with the unsaturated monomer (b) by a known polymerization method.

In the silyl ester (co)polymer (A), the ratio of the contents (weights) of the structural units derived from the monomer (a) and the structural units derived from the unsaturated monomer (b) tends to be consistent with the ratio of the amounts (weights) in which the monomer (a) and the unsaturated monomer (b) are fed to the polymerization reaction.

Medetomidine (B)

The medetomidine is (±)-4-[1-(2,3-dimethylphenyl)ethyl]-1H-imidazole.

The content of the medetomidine (B) in the antifouling coating composition of the invention is preferably 0.001 to 10 wt % relative to (the solid content in) the antifouling coating composition taken as 100 wt %. The content of the medetomidine (B) in the antifouling coating composition of the invention is preferably 0.01 to 50 parts by weight, more preferably 0.02 to 20 parts by weight, and still more preferably 0.04 to 10 parts by weight per 100 parts by weight, of the silyl ester (co)polymer (A). When the content of the medetomidine (B) satisfies these ranges, antifouling coating films obtained from the antifouling coating composition of the invention attain excellent antifouling properties. To ensure that antifouling coating films will exhibit outstanding antifouling properties and the antifouling coating composition will attain particularly high storage stability, the content of the medetomidine (B) is particularly preferably 0.04 to 5 parts by weight per 100 parts by weight of the silyl ester (co)polymer (A).

Optional Components

In addition to the components described above, the antifouling coating composition of the invention may contain various components used in general coating compositions, such as an antifouling agent (C) other than the medetomidine (B), a dehydrating agent (D), a rosin (E), a monocarboxylic acid compound (F), a coloring pigment (G), an extender pigment (H), a plasticizer (I), a thixotropic agent (J), an additional resin (K) other than the silyl ester (co)polymer (A), and a solvent (L).

Antifouling Agents (C) Other Than Medetomidine

By containing an antifouling agent (C) other than the medetomidine (B), the antifouling coating composition of the invention can give antifouling coating films having a further enhanced antifouling performance.

Inorganic and organic antifouling agents may be used as the antifouling agents (C) other than medetomidine. Preferred examples include cuprous oxide, copper rhodanide, copper, copper pyrithione, zinc pyrithione, 4-bromo-2-(4-chlorophenyl)-5-(trifluoromethyl)-1H-pyrrole-3-carbonitrile, 4,5-dichloro-2-n-octyl-4-isothiazolin-3-one, borane-nitrogen base adducts (such as pyridine triphenylborane and 4-isopropylpyridine diphenylmethylborane), N,N-dimethyl-N'-(3,4-dichlorophenyl)urea, N-(2,4,6-trichlorophenyl)maleimide, 2-methylthio-4-tert-butylamino-6-cyclopropylamino-1,3,5-triazine, 2,4,5,6-tetrachloroisophthalonitrile, bisdimethyldithiocarbamoyl zinc ethylene bisdithiocarbamate, chloromethyl-n-octyl disulfide, N,N'-dimethyl-N'-phenyl-(N-fluorodichloromethylthio)sulfamide, tetraalkyl thiuram disulfides, zinc dimethyl dithiocarbamate, zinc ethylene bisdithiocarbamate, 2,3-dichloro-N-(2',6'-diethylphenyl 5 maleimide and 2,3-dichloro-N-(2'-ethyl-6'-methylphenyl)maleimide. A combination of any of these compounds may be used.

The amount of the antifouling agent (C) other than medetomidine may be adjusted appropriately and is, for example, 0.01 to 1000 parts by weight, per 100 parts by weight of the silyl ester (co)polymer (A).

Dehydrating Agents (D)

By containing a dehydrating agent (D), the antifouling coating composition of the invention can attain a further enhancement in coating storage stability.

The dehydrating agent (D) may be an inorganic or organic agent, or may be a combination of such agents.

Examples of the inorganic dehydrating agents include calcium sulfate, zeolites, alumina and silica.

Examples of the organic dehydrating agents include hydrolyzable group-containing organosilanes, orthoesters such as alkyl orthoformate esters, orthoboric acid and isocyanates.

The content of the dehydrating agent (D) in the antifouling coating composition of the invention is preferably 0.01 to 200 parts by weight, and more preferably 0.1 to 50 parts by weight per 100 parts by weight of the silyl ester (co)polymer (A). The content of the dehydrating agent (D) in the antifouling coating composition of the invention is preferably 0.1 to 100,000 parts by weight, and more preferably 1 to 10,000 parts by weight per 100 parts by weight of the medetomidine (B). When the amount of the dehydrating agent (D) satisfies these ranges, good coating storage stability can be obtained.

Rosins (E)

When the antifouling coating composition of the invention contains a rosin (E), antifouling coating films obtained from the antifouling coating composition can attain enhancements in surface renewability and water resistance. Further, the incorporation of a rosin (E) results in a further enhancement in coating storage stability of the antifouling coating composition.

Examples of the rosins (E) include such rosins as gum rosin, wood rosin and tall oil rosin, rosin derivatives such as hydrogenated rosins, disproportionate rosins and rosin metal salts, and pine tar.

The amount of the rosin (E) may be adjusted appropriately, and is, for example, 0.01 to 1,000 parts by weight, and preferably 1 to 500 parts by weight per 100 parts by weight of the silyl ester (co)polymer (A).

Monocarboxylic Acid Compounds (F)

When the antifouling coating composition of the invention contains a monocarboxylic acid compound (F), antifouling coating films obtained from the antifouling coating composition can attain enhancements in surface renewability and water resistance.

Some preferred monocarboxylic acid compounds (F) are saturated or unsaturated aliphatic hydrocarbon groups having 10 to 20 carbon atoms, saturated or unsaturated alicyclic hydrocarbon groups having 3 to 20 carbon atoms, and substituted forms of these. In particular, trimethylisobutenylcyclohexenecarboxylic acid compounds, versatic acid, palmitic acid, stearic acid, oleic acid, linoleic acid, linolenic acid, abietic acid, neoabietic acid, pimaric acid, dehydroabietic acid, 12-hydroxystearic acid and naphthenic acid, and salts of these acids (for example, metal salts) are preferable. Examples of the trimethylisobutenylcyclohexenecarboxylic acids include a reaction product of 2,6-dimethylocta-2,4,6-triene with methacrylic acid, the product being based on (containing 85% or more) 1,2,3-trimethyl-5-(2-methylprop-1-en-1-yl)cyclohex-3-ene-1-carboxylic acid and 1,4,5-trimethyl-2-(2-methylprop-1-en-1-yl)cyclohex-3-ene-1-carboxylic acid.

The amount of the monocarboxylic acid compound (F) may be adjusted appropriately, and is, for example, 0.01 to 1,000 parts by weight, and preferably 1 to 500 parts by weight per 100 parts by weight of the silyl ester (co)polymer (A).

Coloring Pigments (G)

Examples of the coloring pigments (G) include inorganic pigments such as red iron oxide, titanium white (titanium oxide) and yellow iron oxide, and organic pigments such as carbon black, naphthol red and phthalocyanine blue. The coloring pigments may be used singly, or two or more may be used in combination. The coloring pigments may further include various colorants such as dyes.

The amount of the coloring pigment (G) may be adjusted appropriately, and is, for example, 0.05 to 125 parts by weight per 100 parts by weight of the silyl ester (co)polymer (A).

Extender Pigments (H)

The extender pigments (H) are such pigments that have a low refractive index and, when kneaded with oils or varnishes, are transparent and do not conceal the coated surface. Examples of the extender pigments (H) include talc, mica, clay, potassium feldspar, zinc oxide, calcium carbonate, kaolin, alumina white, white carbon, aluminum hydroxide, magnesium carbonate, barium carbonate, barium sulfate and zinc sulfide. In particular, zinc oxide, talc, mica, clay, calcium carbonate, kaolin, barium sulfate and potassium feldspar are preferable. The extender pigments (H) may be used singly, or two or more may be used in combination.

The amount of the extender pigment (H) may be adjusted appropriately, and is, for example, 0.5 to 250 parts by weight per 100 parts by weight of the silyl ester (co)polymer (A).

Plasticizers (I)

The plasticizer (I) is a component that contributes to enhancing the crack resistance and water resistance of antifouling coating films and to suppressing discoloration of the antifouling coating films. Examples of the plasticizers (I) include n-paraffins, chlorinated paraffins, terpene phenols, tricresyl phosphate (TCP) and polyvinyl ethyl ethers. In particular, chlorinated paraffins and terpene phenols are preferable, and chlorinated paraffins are particularly preferable. These plasticizers may be used singly, or two or more may be used in combination. A commercial n-paraffin which may be used is "n-paraffin" manufactured by JXTG Nippon Oil & Energy Corporation. Some commercial chlorinated paraffins which may be used are "TOYGPARAX A-40/A-50/A-70/A-145/A-150" manufactured by TOSOH CORPORATION.

The amount of the plasticizer (I) may be adjusted appropriately, and is, for example, 1 to 5 wt % relative to all the solid content in the antifouling coating composition.

Thixotropic Agents (J)

The thixotropic agent (J) is a component which contributes to the prevention of the sagging and settling of the coating.

Examples of the thixotropic agents (J) include organic bentonites, Al, Ca or Zn stearate, lecithin, alkylsulfonate salts, polyethylene waxes, oxidized polyethylene waxes, amide waxes, hydrogenated castor oil waxes, and amide wax/oxidized polyethylene wax composite. These thixotropic agents may be used singly, or two or more may be used in combination.

The amount of the thixotropic agent (J) may be adjusted appropriately, and is, for example, 0.25 to 50 parts by weight per 100 parts by weight of the silyl ester (co)polymer (A).

Additional Resins (K)

Where necessary, the antifouling coating composition of the invention may contain one, or two or more kinds of additional resins (K) other than the silyl ester (co)polymer (A).

Examples of such resins which may be used include water-insoluble or poorly water-soluble resins such as metal ester bond-free acrylic resins, metal (except silicon) ester-group-containing acrylic resins/acrylic silicone resins, polyester resins, unsaturated polyester resins, fluororesins, polybutene resins, silicone rubbers, polyurethane resins, epoxy resins, polyamide resins, vinyl resins (such as vinyl chloride copolymers, ethylene-vinyl acetate copolymers), chlorinated rubbers, chlorinated olefin resins, styrene-butadiene copolymer resins, ketone resins, alkyd resins, coumarone resins, terpene phenol resins and petroleum resins.

The amount of the additional resin (K) may be adjusted appropriately, and is, for example, 0.01 to 1,000 parts by weight per 100 parts by weight of the silyl ester (co)polymer (A).

Solvents (L)

Similarly to usual antifouling coating compositions, the antifouling coating composition of the invention is a solution or a dispersion of the aforementioned components in a solvent. In the present invention, solvents commonly used for antifouling coatings may be used, with examples including aliphatic solvents, aromatic solvents (such as xylene and toluene), ketone solvents (such as MIBK and cyclohexanone), ester solvents, ether solvents (such as propylene glycol monomethyl ether and propylene glycol monomethyl ether acetate) and alcohol solvents (such as isopropyl alcohol).

The amount of the solvent (L) may be adjusted appropriately, and is, for example, such that the proportion of all the solid content in the antifouling coating composition will be 20 to 90 wt %, and an additional amount may be added at the time of coating operation in accordance with workability.

Methods for Producing Antifouling Coating Compositions

The antifouling coating composition of the invention may be prepared using techniques such as a device and a tool which are similar to those with which general known antifouling coatings are produced. For example, the composition may be produced by preparing the silyl ester (co)polymer (A) first, adding the (co)polymer (A) (here, the (co)polymer (A) may be in the form of a solution of the (co)polymer (A) (the solution obtained during the production of the (co)polymer (A)), the medetomidine (B) and optionally other components such as additives into the solvent, at once or sequentially, and mixing the mixture by stirring.

The antifouling coating composition of the invention with its excellent, long-term storage stability can be stored not only as separate agents including the silyl ester (co)polymer (A) and the medetomidine (B) separately, but also as a one pack coating containing the silyl ester (co)polymer (A) and the medetomidine (B) together.

Antifouling Coating Films and Antifouling Substrates

The antifouling coating film of the present invention includes the solid content in the antifouling coating composition of the invention. The antifouling coating film of the invention is formed from the antifouling coating composition of the invention. When, for example, the antifouling coating composition contains the solvent (L), the coating film may be formed by curing (that is, removing the solvent (L) from) the antifouling coating composition of the invention that has been applied onto a substrate, by, for example, natural drying or using a drying device such as a heater.

The antifouling substrate of the invention includes a substrate and the inventive antifouling coating film disposed on a surface of the substrate. The antifouling substrate may be produced by, for example, coating a substrate (the substrate may also be a target to be prevented from fouling, or an object to be coated) with the antifouling coating composition of the invention using a coating device such as an air sprayer, an airless sprayer, a brush or a roller, or impregnating the substrate with the composition, and drying and curing the coating composition that has been caused to coat or impregnate the substrate by, for example, natural drying (drying at about room temperature) or by the use of a drying device such as a heater, thereby forming an antifouling coating film on the substrate.

Alternatively, the antifouling substrate of the invention may be produced by forming an antifouling coating film from the inventive antifouling coating composition on a surface of a tentative substrate, releasing the antifouling coating film from the tentative substrate, and attaching the coating film onto a substrate that is to be prevented from fouling. During this process, the antifouling coating film may be attached onto the substrate via an adhesive layer.

Although the substrates are not particularly limited, some preferred substrates are those which are placed in contact with seawater or freshwater. Specific examples include underwater structures such as water supply inlets and drains in various power plants (thermal power plants and nuclear power plants), coast roads, submarine tunnels, port facilities, and sludge diffusion prevention films used in various offshore or river engineering works for building structures such as canals and waterways; outside shell of ships (in particular, ship's portions from the waterline to the bottom); and fishery materials (such as ropes, fishing gears including fishing nets, floats and buoys).

The substrates may be of any material without limitation as long as the substrates require precautions for problems such as fouling in water. In particular, example materials for outside shell of a ship include steel, aluminum, wood and FRP, and example materials for fishery materials include natural or synthetic fibers for fishing nets and the like, and synthetic resins for floats, buoys and the like.

When, in particular, the substrate is a ship's bottom or the like, an undercoat primer such as an anticorrosive coating is usually applied to the surface of the steel substrate, then the antifouling coating composition (the antifouling coating) of the invention is applied to or is caused to impregnate the surface of the primer-coated substrate (the impregnation is adopted particularly when the substrate is a fishing net or the like) by the method described hereinabove one or more times, and the antifouling coating composition that has been applied onto or impregnated into the substrate is cured to form an antifouling coating film. The resultant coating film has excellent characteristics (antifouling properties, in particular, static antifouling properties) in preventing the attachment of aquatic organisms such as sea lettuce, barnacles, green layer, serpula, oysters and bryozoans (Bugula neritina) over a long term, and can release the antifouling components in a sustained manner over a long period.

Usually, the surface of the substrate is sometimes primer-coated or has a layer formed from various binder coatings. In the case where the substrate is outside shell of a ship (in particular, a ship's bottom), an underwater structure or the like, the antifouling coating composition may be applied to the surface of the substrate several times (in other words, in a large thickness so that the dry thickness of the obtainable coating film will be about 100 to 600 µm). The antifouling substrate thus obtained attains excellent antifouling properties and exhibits appropriate flexibility and outstanding crack, resistance in a well-balanced manner.

When the substrate used in the production of the antifouling substrate is, for example, a steel sheet or a fishing net which already has a degraded antifouling coating film, the antifouling coating composition of the invention may be applied directly to the surface or, in the case of the substrate being a fishing net or the like, the surface thereof may be impregnated with the antifouling coating composition of the invention. When the substrate is a bare steel sheet, an undercoating agent such as an anticorrosive agent or a primer may be applied first to the substrate surface to form an undercoat layer, and thereafter the antifouling coating composition of the invention may be applied to the surface of the undercoat layer. Further, the surface of the substrate which already has the antifouling coating film of the invention or a conventional antifouling coating film may be overcoated with the antifouling coating film of the invention for the purpose of repairing.

The thickness of the antifouling coating film of the invention formed by one coating operation is not particularly limited. When the substrate is outside shell of a ship or an underwater structure, the thickness per coating operation is, for example, about 30 to 250 µm.

Underwater structures having the antifouling coating film of the invention can be prevented from the attachment of aquatic organisms over a long period and thus can maintain their functions over a long term. Fishing nets having the antifouling coating film of the invention have a low risk of environmental contamination, and can be prevented from the attachment, of aquatic organisms and thus can be prevented from the clogging of the meshes.

EXAMPLES

Hereinbelow, the present invention will be described in greater detail based on Examples. However, the scope of the invention is not limited to such Examples.

Viscosity of Silyl Ester (Co)Polymer Solution

The viscosity of a silyl ester (co)polymer solution at 25° C. was measured with a cone-plate viscometer (manufactured by TOKI SANGYO CO., LTD).

Concentration of Solid Content in Silyl Ester (Co)Polymer Solution

The term solid content means a heating residue that is left when a reaction mixture, a coating, an uncured film or the like containing components such as resins and solvents is dried in a hot air dryer at 105° C. for 3 hours to evaporate volatiles such as solvents. The solid content are film-forming components which usually include resins and other components such as pigments.

Number Average Molecular Weight (Mn) and Weight Average Molecular Weight (Mw) of Silyl Ester (Co)Polymer The number average molecular weight (Mn) and weight average molecular weight (Mw) of a silyl ester (co)polymer were measured by GPC (gel permeation chromatography) under the following conditions.

GPC Conditions

Apparatus: "HLC-8120GPC" (manufactured by TOSOH CORPORATION) Columns: "Super H2000+ H4000" (manufactured by TOSOH CORPORATION, 6 mm (inner diameter), each 15 cm (length))
Eluent: tetrahydrofuran (THF)
Flow rate: 0.500 ml/rain
Detector: RI
Column thermostatic chamber temperature: 40° C.
Standard substance: polystyrene
Sample preparation: The polymer solution prepared in each Production Example was dehydrated by the addition of a small amount of calcium chloride and was filtered through a membrane filter. The residue obtained was used as a GPC measurement sample.

[Production Example 1] Production of Silyl Ester Copolymer Solution (A-1)

A reaction container equipped with a stirrer, a condenser, a thermometer, a dropping device, a nitrogen inlet tube and a heating/cooling jacket was loaded with 54 parts by weight of xylene and 70 parts by weight of triisopropylsilyl methacrylate. In a flow of nitrogen, the mixture was stirred while performing heating at a temperature of 85° C.±5° C. While keeping the temperature, a mixture of 30 parts by weight of methyl methacrylate and 0.75 parts by weight of 2,2'-azobis-2-methylbutyronitrile was dropped from the dropping device into the reaction container over a period of 2 hours. Thereafter, stirring was performed at the temperature for 4 hours, 0.4 parts by weight of 2,2'-azobisisobutyronitrile was added, the resultant mixture was stirred at the temperature for 4 hours, and 26 parts of xylene was added. A colorless transparent silyl ester copolymer solution (A-1) was thus obtained.

Table 1 describes the amounts of the monomer components used, and characteristic values of the solution (A-1) and the silyl ester copolymer present in the solution.

[Production Example 2] Production of Silyl Ester Copolymer Solution (A-2)

A reaction container equipped with a stirrer, a condenser, a thermometer, a dropping device, a nitrogen inlet tube and a heating/cooling jacket was loaded with 54 parts by weight of xylene. In a flow of nitrogen, stirring was performed while performing heating at a temperature of 85° C.±5° C. While keeping the temperature, a mixture of 55 parts by weight of triisopropylsilyl methacrylate, 30 parts by weight of 2-methoxyethyl methacrylate, 10 parts by weight of butyl acrylate, 5 parts by weight of methyl methacrylate and 0.65 parts by weight of 2,2'-azobisisobutyronitrile was dropped from the dropping device into the reaction container over a period of 2 hours. Thereafter, stirring was performed at the temperature for 4 hours, 0.4 parts by weight, of 2,2'-azobisisobutyronitrile was added, the resultant mixture was stirred at the temperature for 2 hours, and 14 parts by weight of xylene was added. A colorless transparent silyl ester copolymer solution (A-2) was thus obtained.

Table 1 describes the amounts of the monomer components used, and characteristic values of the solution (A-2) and the silyl ester copolymer present in the solution.

[Production Examples 3 to 6] Production of Silyl Ester Copolymer Solutions (A-3) to (A-6)

Silyl ester copolymer solutions (A-3) to (A-6) containing a silyl ester copolymer were prepared in the same manner as in Production Example 2, except that the mixture used in Production Example 2 was replaced by a mixture of the monomer components in the proportions shown in Table 1 and 2,2'-azobisisobutyronitrile, and that the amounts of xylene and the polymerization catalyst (2,2'-azobisisobutyronitrile) were adjusted appropriately.

Table 1 describes the amounts of the monomer components used, and characteristic values of the solutions (A-3) to (A-6) and the silyl ester copolymers present in the solutions.

[Production Example 7] Production of Silyl Ester Copolymer Solution (A-7)

A silyl ester copolymer solution (A-7) containing a silyl ester copolymer was prepared in the same manner as in Production Example 1, except that the triisopropylsilyl methacrylate was replaced by 70 parts by weight of triisopropylsilyl acrylate, and that the amounts of xylene and the polymerization catalysts (2,2'-azobis-2-methylbutyronitrile and 2,2'-azobisisobutyronitrile) were adjusted appropriately.

Table 1 describes the amounts of the monomer components used, and characteristic values of the solution (A-7) and the silyl ester copolymer present in the solution.

TABLE 1

|  |  | Prod. Ex. 1 | Prod. Ex. 2 | Prod. Ex. 3 | Prod. Ex. 4 | Prod. Ex. 5 | Prod. Ex. 6 | Prod. Ex. 7 |
|---|---|---|---|---|---|---|---|---|
|  | Silyl ester copolymer solution | A-1 | A-2 | A-3 | A-4 | A-5 | A-6 | A-7 |
| Monomer components | Triisopropylsilyl methacrylate | 70 | 55 | 40 | 55 | 60 | 55 |  |
|  | Triisopropylsilyl acrylate |  |  |  | 20 |  |  | 70 |
|  | 2-Methoxyethyl methacrylate |  | 30 | 30 |  |  | 30 |  |
|  | 2-Methoxyethyl acrylate |  |  |  |  | 25 |  |  |
|  | Butyl acrylate |  | 10 |  | 5 |  | 10 |  |
|  | Methyl methacrylate | 30 | 5 | 30 | 20 | 15 | 5 | 30 |
|  | Total | 100 | 100 | 100 | 100 | 100 | 100 | 100 |
| Characteristic values of silyl ester copolymers or | Solid content (wt %) | 55.9 | 59.9 | 55.8 | 60.1 | 60.3 | 60.6 | 55.4 |
|  | Viscosity (cps/25° C.) | 1,563 | 2,164 | 2,360 | 2,701 | 1,842 | 1,052 | 1,539 |
|  | Number average molecular weight (Mn) | 10,893 | 9,988 | 11,852 | 9,772 | 13,505 | 6,950 | 9,032 |

TABLE 1-continued

|  |  | Prod. Ex. 1 | Prod. Ex. 2 | Prod. Ex. 3 | Prod. Ex. 4 | Prod. Ex. 5 | Prod. Ex. 6 | Prod. Ex. 7 |
|---|---|---|---|---|---|---|---|---|
| solutions thereof | Weight average molecular weight (Mw) | 44,878 | 47,902 | 40,070 | 48,320 | 42,318 | 22,533 | 40,266 |

Examples 1 to 28 and Comparative Examples 1 to 4

Production of Antifouling Coating Compositions

The components shown in Table 2, such as the solutions (A-1 to A-7) containing the silyl ester copolymers obtained in Production Examples 1 to 7, and medetomidine (B), were mixed together uniformly in the proportions described in Table 2 (the values in the table indicate parts by weight) with use of a paint shaker to give antifouling coating compositions. The compositions were evaluated by the following methods.

Storage Stability

The antifouling coating compositions of Examples and Comparative Examples were each stored at 50° C. for 2 weeks, and the viscosity was compared to that, before the storage. The difference in viscosity value between before and after the storage was divided by the viscosity before the storage to calculate the "viscosity increase ratio (%)", based on which the storage stability of the antifouling coating composition was evaluated.

The viscosity of the composition was measured at a temperature of 23° C. with a Stormer viscometer (manufacturer: TAIYU KIZAI K.K., product, name: STORMER VISCOMETER, model: 691).

Static Antifouling Properties of Coating Films

An epoxy anticorrosive coating (epoxy AC coating, product name: "BANNOH 500", manufactured by Chugoku Marine Paints, Ltd.) was applied onto a sandblasted steel sheet (300 mm in length×100 mm in width×3.2 mm in thickness) so that the dry thickness of the coating film would be 150 μm. Thereafter, a vinyl binder coating (product name: "SILVAX SQ-K", manufactured by Chugoku Marine Paints, Ltd.) was applied thereon so that the dry thickness of the coating film would be 40 μm. Subsequently, any of the antifouling coating compositions produced in Examples was applied one time so that, its dry thickness would be 100 μm. The wet film was dried at room temperature for 7 days. Test sheets having an antifouling coating film were thus fabricated. The above three coating operations took place at a rate of one operation per day.

The test sheets fabricated as described above were immersed in Tokyo Bay under static conditions for three months in slimmer. The area of portions of the antifouling coating film fouled by barnacles (hereinafter, also written as the "barnacle fouling area") was measured. The static antifouling properties of the antifouling coating film were evaluated in accordance with [Criteria in evaluation of static antifouling properties based on barnacle fouling area] below. The results are described in Table 2.

Criteria in Evaluation of Static Antifouling Properties Based on Barnacle Fouling Area 0: No barnacles had attached,
1: Barnacles had attached locally.
2: Barnacles had attached to the entire surface.

TABLE 2

|  |  | Examples | | | | | | | | | | | | | | | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| | Compositions of coatings (unit: parts by weight) | | | | | | | | | | | | | | | | |
| A | Copolymer solution A-1 (55.9% solid) | 20 | 20 | | | | | | | | | | | | | | |
| | Copolymer solution A-2 (59.9% solid) | | | 20 | | | | | | 20 | 20 | 20 | 20 | 20 | 20 | 15 | 25 |
| | Copolymer solution A-3 (55.8% solid) | | | | 20 | | | | | | | | | | | | |
| | Copolymer solution A-4 (60.1% solid) | | | | | 20 | 20 | | | | | | | | | | |
| | Copolymer solution A-5 (60.3% solid) | | | | | | | 20 | | | | | | | | | |
| | Copolymer solution A-6 (60.6% solid) | | | | | | | | 20 | | | | | | | | |
| | Copolymer solution A-7 (55.4% solid) | | | | | | | | | | | | | | | | |
| | Acrylic resin BR-106 (*1) | | | | | | | | | | | | | | | | |
| B | Medetomidine | 0.1 | 0.1 | 0.1 | 0.1 | 0.1 | 0.1 | 0.1 | 0.1 | 0.3 | 0.5 | 0.1 | 0.1 | 0.1 | 0.1 | 0.1 | 0.1 |
| C | Cuprous oxide 1 (*2) | 45 | 45 | 45 | 45 | 45 | 45 | 45 | 45 | 45 | 45 | 45 | 45 | 45 | 45 | 45 | 45 |
| | Cuprous oxide 2 (*3) | | | | | | | | | | | | | | | | |
| | 4,5-Dichloro-2-n-octyl-4-isothiazolin-3-one (30% solid) | | | | | | | | | | | | 3 | | | | |
| | Zinc dimethyldithiocarbonate | | | | | | | | | | | | | 3 | | | |

TABLE 2-continued

|  |  | (cont. 1) | (cont. 2) | (cont. 3) | (cont. 4) | (cont. 5) | (cont. 6) | (cont. 7) | (cont. 8) | (cont. 9) | (cont. 10) | (cont. 11) | (cont. 12) | (cont. 13) | (cont. 14) | (cont. 15) | (cont. 16) |
|---|---|---|---|---|---|---|---|---|---|---|---|---|---|---|---|---|
|  | Copper pyrithione | 3 | 3 | 3 | 3 | 3 | 3 | 3 | 3 | 3 | 3 |  |  | 3 | 3 | 3 | 3 |
|  | Copper rhodanide |  |  |  |  |  |  |  |  |  |  |  |  |  |  |  |  |
|  | Zinc pyrithione |  |  |  |  |  |  |  |  |  |  |  |  |  |  |  |  |
|  | Pyridine triphenylborane |  |  |  |  |  |  |  |  |  |  |  |  |  |  |  |  |
| D | Calcium sulfate anhydride |  | 0.5 | 0.5 | 0.5 | 0.5 | 0.5 | 0.5 | 0.5 | 0.5 | 0.5 | 0.5 |  |  | 0.5 | 0.5 | 0.5 |
|  | Ethyl Silicate 28 (*4) |  |  |  |  |  |  |  |  |  |  |  | 0.5 |  |  |  |  |
| E | Rosin (50% solid) |  |  |  |  |  |  |  |  |  |  |  |  |  |  |  |  |
| F | Trimethylisobutenylcyclo-hexenecarboxylic acid (50% solid) (*5) | 10 | 10 | 10 | 10 | 10 |  | 10 | 10 | 10 | 10 | 10 | 10 | 10 | 10 | 15 | 5 |
|  | Zinc oxide | 4 | 4 | 4 | 4 | 4 | 4 | 4 | 4 | 4 | 4 | 4 | 4 | 4 | 4 | 4 | 4 |
|  | Red iron oxide | 2 | 2 | 2 | 2 | 2 | 2 | 2 | 2 | 2 | 2 | 2 | 2 | 2 | 2 | 2 | 2 |
|  | Oxidized polyethylene wax (20% solid) | 2 | 2 | 2 | 2 | 2 | 2 | 2 | 2 | 2 | 2 | 2 | 2 | 2 | 2 | 2 | 2 |
|  | Fatty acid amide wax (20% solid) | 3 | 3 | 3 | 3 | 3 | 3 | 3 | 3 | 3 | 3 | 3 | 3 | 3 | 3 | 3 | 3 |
|  | Xylene | 10.9 | 10.9 | 10.9 | 10.9 | 10.9 | 10.9 | 10.9 | 10.9 | 10.9 | 10.9 | 10.9 | 10.9 | 10.9 | 10.9 | 10.9 | 10.9 |
|  | Propylene glycol monomethyl ether | 1 | 1 | 1 | 1 | 1 | 1 | 1 | 1 | 1 | 1 | 1 | 1 | 1 | 1 | 1 | 1 |
|  | Total | 101 | 102 | 102 | 102 | 102 | 91.5 | 102 | 102 | 102 | 102 | 102 | 102 | 102 | 101 | 102 | 102 |

Properties of coatings and coating films

|  |  | (cont. 1) | (cont. 2) | (cont. 3) | (cont. 4) | (cont. 5) | (cont. 6) | (cont. 7) | (cont. 8) | (cont. 9) | (cont. 10) | (cont. 11) | (cont. 12) | (cont. 13) | (cont. 14) | (cont. 15) | (cont. 16) |
|---|---|---|---|---|---|---|---|---|---|---|---|---|---|---|---|---|---|
|  | Storage stability (viscosity increase ratio (%)) | 11% | 8% | 6% | 6% | 10% | 12% | 6% | 6% | 10% | 19% | 4% | 8% | 4% | 10% | 6% | 6% |
|  | Antifouling properties | 0 | 0 | 0 | 0 | 0 | 0 | 0 | 0 | 0 | 0 | 0 | 0 | 0 | 0 | 0 | 0 |

|  |  | Examples | | | | | | | | | | | | Comparative Examples | | | |
|---|---|---|---|---|---|---|---|---|---|---|---|---|---|---|---|---|---|
|  |  | 17 | 18 | 19 | 20 | 21 | 22 | 23 | 24 | 25 | 26 | 27 | 28 | 1 | 2 | 3 | 4 |
|  | Compositions of coatings (unit: parts by weight) | | | | | | | | | | | | | | | | |
| A | Copolymer solution A-1 (55.9% solid) |  |  |  |  |  |  |  |  |  |  |  |  |  |  |  |  |
|  | Copolymer solution A-2 (59.9% solid) | 20 | 15 | 22 | 20 | 20 | 20 | 20 | 20 | 20 | 20 |  |  |  |  |  | 20 |
|  | Copolymer solution A-3 (55.8% solid) |  |  |  |  |  |  |  |  |  |  | 20 |  |  |  |  |  |
|  | Copolymer solution A-4 (60.1% solid) |  |  |  |  |  |  |  |  |  |  |  | 20 |  |  |  |  |
|  | Copolymer solution A-5 (60.3% solid) |  |  |  |  |  |  |  |  |  |  |  |  |  |  |  |  |
|  | Copolymer solution A-6 (60.6% solid) |  |  |  |  |  |  |  |  |  |  |  |  |  |  |  |  |
|  | Copolymer solution A-7 (55.4% solid) |  |  |  |  |  |  |  |  |  |  |  |  | 20 | 20 |  |  |
|  | Acrylic resin BR-106 (*1) |  |  |  |  |  |  |  |  |  |  |  |  |  |  | 20 |  |
| B | Medetomidine | 0.1 | 0.1 | 0.1 | 0.3 | 0.3 | 0.3 | 0.3 | 0.3 | 0.3 | 0.1 | 0.1 | 0.1 |  | 0.1 | 0.1 |  |
| C | Cuprous oxide 1 (*2) | 45 | 45 | 45 | 45 | 45 |  |  |  |  | 45 | 45 | 45 | 45 | 45 | 45 | 45 |
|  | Cuprous oxide 2 (*3) |  |  |  |  |  |  |  |  | 45 |  |  |  |  |  |  |  |
|  | 4,5-Dichloro-2-n-octyl-4-isothiazolin-3-one (30% solid) |  |  |  |  |  |  |  |  |  |  |  |  |  |  | 3 |  |
|  | Zinc dimethyldithiocarbonate |  |  |  |  |  |  |  |  |  |  |  |  |  |  |  |  |
|  | Copper pyrithione | 3 | 3 | 3 | 3 | 3 |  | 3 |  | 3 | 3 | 3 | 3 | 3 | 3 |  | 3 |
|  | Copper rhodanide |  |  |  |  |  |  | 30 |  |  |  |  |  |  |  |  |  |
|  | Zinc pyrithione |  |  |  |  |  |  |  | 10 |  |  |  |  |  |  |  |  |
|  | Pyridine triphenylborane |  |  |  |  |  |  |  |  | 5 |  |  |  |  |  |  |  |
| D | Calcium sulfate anhydride | 0.5 | 0.5 | 0.5 | 0.5 | 0.5 | 0.5 | 0.5 | 0.5 | 0.5 | 0.5 | 0.5 | 0.5 |  |  |  |  |
|  | Ethyl Silicate 28 (*4) |  |  |  |  |  |  |  |  |  |  |  |  |  |  |  |  |
| E | Rosin (50% solid) | 10 | 15 | 8 | 10 | 0.3 |  |  |  |  |  | 10 | 10 |  |  |  |  |
| F | Trimethylisobutenylcyclo-hexenecarboxylic acid (50% solid) (*5) |  |  |  |  | 10 | 10 | 10 | 10 | 10 | 10 |  |  | 10 | 10 | 10 | 10 |
|  | Zinc oxide | 4 | 4 | 4 | 4 | 4 | 4 | 4 | 4 | 4 | 4 | 4 | 4 | 4 | 4 | 4 | 4 |
|  | Red iron oxide | 2 | 2 | 2 | 2 | 2 | 2 | 2 | 2 | 2 | 2 | 2 | 2 | 2 | 2 | 2 | 2 |
|  | Oxidized polyethylene wax (20% solid) | 2 | 2 | 2 | 2 | 2 | 2 | 2 | 2 | 2 | 2 | 2 | 2 | 2 | 2 | 2 | 2 |
|  | Fatty acid amide wax (20% solid) | 3 | 3 | 3 | 3 | 3 | 3 | 3 | 3 | 3 | 3 | 3 | 3 | 3 | 3 | 3 | 3 |
|  | Xylene | 10.9 | 10.9 | 10.9 | 10.9 | 10.9 | 10.9 | 10.9 | 10.9 | 10.9 | 10.9 | 10.9 | 10.9 | 10.9 | 10.9 | 10.9 | 10.9 |
|  | Propylene glycol monomethyl ether | 1 | 1 | 1 | 1 | 1 | 1 | 1 | 1 | 1 | 1 | 1 | 1 | 1 | 1 | 1 | 1 |
|  | Total | 102 | 102 | 102 | 102 | 102 | 53.7 | 86.7 | 63.7 | 61.7 | 102 | 102 | 102 | 101 | 101 | 101 | 101 |

TABLE 2-continued

| Properties of coatings and coating films | | | | | | | | | | | | | | | |
|---|---|---|---|---|---|---|---|---|---|---|---|---|---|---|---|
| Storage stability (viscosity increase ratio (%)) | 6% | 5% | 6% | 8% | 8% | 9% | 10% | 11% | 13% | 5% | 6% | 7% | 0% | >100% | 0% | 0% |
| Antifouling properties | 0 | 0 | 0 | 0 | 0 | 0 | 0 | 0 | 0 | 0 | 0 | 0 | 2 | 0 | 1 | 2 |

(*1) Dianal BR-106 (MITSUBISHI RAYON CO., LTD.),
(*2) NC-301 (NISSIN CHEMCO LTD.),
(*3) Purple copp 2A (American Chemet Corp),
(*4) Ethyl Silicate 28 (COLCOAT CO., LTD.),
(*5) Reaction product of 2,6-dimethylocta-2,4,6-triene with methacrylic acid, based on 1,2,3-trimethyl-5-(2-methylprop-1-en-1-yl)cyclohex-3-ene-1-carboxylic acid and 1,4,5-trimethyl-2-(2-methylprop-1-en-1-yl)cyclohex-3-ene-1-carboxylic acid

The invention claimed is:

1. An antifouling coating composition; comprising:
a silyl ester (co)polymer (A) and
medetomidine (B),
wherein the silyl ester (co)polymer (A) comprises structural units derived from a monomer (a) represented by formula (I):

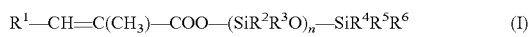

$$R^1—CH=C(CH_3)—COO—(SiR^2R^3O)_n—SiR^4R^5R^6 \quad (I)$$

wherein $R^2$, $R^3$, $R^4$, $R^5$ and $R^6$ are each independently a $C_{1-20}$ monovalent organic group optionally having a heteroatom,
$R^1$ is a hydrogen atom or $R^7$—O—C=O; wherein $R^7$ is a hydrogen atom, a $C_{1-20}$ monovalent organic group optionally having a heteroatom, or a silyl group represented by $R^8R^9R^{10}Si$, wherein $R^8$, $R^9$ and $R^{10}$ are each independently a $C_{1-20}$ monovalent organic group optionally having a heteroatom, and
n is 0 or an integer of 1 or greater.

2. The antifouling coating composition according to claim 1, wherein the medetomidine (B) is present in a ratio of 0.01 to 50 parts by weight to 100 parts by weight of the silyl ester (co)polymer (A).

3. The antifouling coating composition according to claim 1, wherein the silyl ester (co)polymer (A) further comprises structural units derived from an unsaturated monomer (b) copolymerizable with the monomer (a).

4. The antifouling coating composition according to claim 3, wherein the unsaturated monomer (b) comprises at least one unsaturated monomer selected from the group consisting of an alkyl (meth)acrylate, phenyl (meth)acrylate, benzyl (meth)acrylate, an alkoxyalkyl (meth)acrylate, a hydroxyalkyl (meth)acrylate, a metal ester group-containing (meth)acrylate, an organosiloxane group-containing (meth)acrylate, and a monomer represented by formula (II):

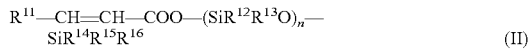

$$R^{11}—CH=CH—COO—(SiR^{12}R^{13}O)_n—SiR^{14}R^{15}R^{16} \quad (II)$$

wherein $R^{12}$, $R^{13}$, $R^{14}$, $R^{15}$ and $R^{16}$ are each independently a $C_{1-20}$ monovalent organic group optionally having a heteroatom,
$R^{11}$ is a hydrogen atom or $R^{17}$—O—C=O wherein $R^{17}$ is a hydrogen atom, a $C_{1-20}$ monovalent organic group optionally having a heteroatom, or a silyl group represented by $R^{18}R^{19}R^{20}Si$, wherein $R^{18}$, $R^{19}$ and $R^{20}$ are each independently a $C_{1-20}$ monovalent organic group optionally having a heteroatom, and
n is 0 or an integer of 1 or greater.

5. The antifouling coating composition according to claim 1, wherein $R^4$, $R^5$ and $R^6$ are all isopropyl groups.

6. The antifouling coating composition according to claim 1, further comprising an antifouling agent (C) other than the medetomidine (B).

7. The antifouling coating composition according to claim 6, wherein the antifouling agent (C) other than the medetomidine (B) is at least one antifouling agent selected from the group consisting of cuprous oxide, copper rhodanide, copper, copper pyrithione, zinc pyrithione, 4-bromo-2-(4-chlorophenyl)-5-(trifluoromethyl)-1H-pyrrole-3-carbonitrile, 4,5-dichloro-2-n-octyl-4-isothiazolin-3-one, borane-nitrogen base adducts, N,N-dimethyl-N'-(3,4-dichlorophenyl)urea, N-(2,4,6-trichlorophenyl)maleimide, 2-methylthio-4-tert-butylamino-6-cyclopropylamino-1,3,5-triazine, 2,4,5,6-tetrachloroisophthalonitrile, bisdimethyldithiocarbamoyl zinc ethylene bisdithiocarbamate, chloromethyl-n-octyl disulfide, N,N'-dimethyl-N'-phenyl-(N-fluorodichloromethylthio)sulfamide, tetraalkyl thiuram disulfides, zinc dimethyl dithiocarbamate, zinc ethylene bisdithiocarbamate, 2,3-dichloro-N-(2',6'-diethylphenyl)maleimide and 2,3-dichloro-N-(2'-ethyl-6'-methylphenyl)maleimide.

8. The antifouling coating composition according to claim 1, further comprising a dehydrating agent (D).

9. The antifouling coating composition according to claim 8, wherein the dehydrating agent (D) is at least one selected from the group consisting of calcium sulfate, a hydrolyzable group-containing organosilane, a zeolite, alumina, silica and an orthoester.

10. The antifouling coating composition according to claim 1, further comprising a rosin (E).

11. The antifouling coating composition according to claim 1, which is a one pack coating.

12. An antifouling coating film formed from the antifouling coating composition of claim 1.

13. An antifouling substrate, comprising:
a substrate and
the antifouling coating film of claim 12 disposed on a surface of the substrate.

14. The antifouling substrate according to claim 13, which is placed in contact with seawater or freshwater.

15. The antifouling substrate according to claim 14, wherein the substrate is an underwater structure, outside shell of a ship or a fishing gear.

16. A method for producing an antifouling substrate, comprising:
coating or impregnating a surface of a substrate with the antifouling coating composition of claim 1, and
curing an antifouling coating coating or impregnating the substrate.

17. A method of storing an antifouling coating composition, comprising:
charging the antifouling coating composition of claim 11 into a container and
storing the antifouling coating composition.

18. A method for producing an antifouling substrate, comprising:
    forming a film from the antifouling coating composition of claim 1 and curing the film to form an antifouling coating film, and
    attaching the antifouling coating film onto a substrate.

* * * * *